Patented Sept. 8, 1936

2,053,549

UNITED STATES PATENT OFFICE 2,053,549

METHOD OF EXTRACTING ADRENAL CORTICAL HORMONES AND THE PRODUCT OF SUCH METHOD

George F. Cartland and Marvin H. Kuizenga, Kalamazoo, Mich.

No Drawing. Application January 10, 1935, Serial No. 1,210

3 Claims. (Cl. 167—77)

This invention relates to the isolation from the adrenal glands of cattle or other mammals of biologically active extracts containing the adrenal cortical hormone which is essential to life.

We have found that by following out the steps of our invention it is possible to produce from mammalian adrenal glands an extract of such adrenal cortical hormones which is of very high efficacy in the treatment of deficiencies in such hormones and that in following out the steps of our invention it is possible to produce such an extract that is of extreme purity and from which toxic and other objectionable impurities are substantially absent.

The objects of this invention are:

First, the provision of a new and improved method of producing such extract containing adrenal cortical hormone.

Second, the provision of such a method of producing said extract which is simple and inexpensive and because of the nature of the various steps involved is well adapted to commercial production of said extract from mammalian adrenal glands on a manufacturing scale in a form suitable for therapeutic use.

Third, to produce such a method that eliminates the epinephrin and other amino compounds, which constitute some of the most troublesome impurities in the extract of adrenal cortical hormone, from the final product, making possible the extraction from whole mammalian adrenal glands without the necessity of dissecting the suprarenal cortex away from the medullary tissue of the gland, which step is commercially prohibitive.

Fourth, to provide such a method which eliminates the heretofore involved, expensive and time consuming manipulations which are not suited to large scale commercial production and which in many cases result in the loss or destruction of a great part or all of the adrenal cortical hormone.

Fifth, to produce such a method that easily and simply eliminates objectionable impurities.

Sixth, to produce such a method that employs as an extracting solvent for the adrenal cortical hormone ethylene dichloride.

Seventh, to provide such a method in which the whole mammalian adrenal glands are extracted in a solvent in the presence of solid carbon dioxide to preserve the glands during the extraction and to exclude air from the glands during the first extraction step.

Eighth, to provide a new and improved extract of adrenal cortical hormone which extract is of high purity and is free from epinephrin and other objectionable amino compounds occurring naturally in mammalian adrenal glands.

Other objects and advantages will appear from the description to follow. The invention is pointed out in the claims.

In carrying out our process, we use whole fresh adrenal glands of slaughter-house animals which glands are frozen immediately after their removal at the slaughter-house and are kept frozen until desired for use. These glands from the slaughter-house are packed in solid carbon dioxide and when received at the laboratory are finely ground or chopped in a chopper such as a food chopper and the finely ground or frozen glands are immediately mixed in acetone which is saturated with carbon dioxide and in which pieces of solid carbon dioxide are placed. Following this procedure keeps the glands in a frozen condition which serves the purpose of preserving them and maintains them in this condition until the acetone has had an opportunity to penetrate the tissue to preserve the same. In addition to this the carbon dioxide serves to acidify the mixture while keeping it cold during the dehydration and extraction of the fresh tissue and maintains the mixture in an atmosphere of carbon dioxide excluding air.

It will be appreciated by those skilled in the art that instead of acetone, ethyl or propyl alcohol could be employed or that any solvent capable of extracting the adrenal cortical hormones, which solvent is also water soluble, could be employed.

In carrying out the invention, we specifically take 28 kilos of the fresh adrenal glands and extract them with 70 liters of acetone for approximately three days at room temperature after the refrigerating effect of the carbon dioxide has abated with mechanical agitation at frequent intervals. The supernatant acetone is siphoned off and the tissue residue is extracted a second time with 56 liters of 80% acetone. The second acetone extract is siphoned off and the tissue residue is separated from the remaining solvent in a filter press.

As the next step, we concentrate the combined acetone extracts in vacuo to remove the acetone and leave an aqueous residue which in the specific instance has a volume of approximately 28 liters. We then extract this aqueous residue which contains the adrenal cortical hormones with petroleum ether. This extraction is done twice using seven liters for each extraction and the petroleum ether removes large quantities of fatty material but leaves practically all of the adrenal cortical hormones behind in the aqueous phase. It will be appreciated that for this step, instead of using specifically petroleum ether, it would be possible to employ any solvent capable of dissolving the fats but incapable of dissolving the adrenal cortical hormone to any great extent.

The solution of the fats is removed from the aqueous residue and the aqueous residue remaining after this separation is extracted with ethylene dichloride. In the specific process we perform three extractions using approximately 14 liters each for the first two times and 7 liters for the last time. The ethylene dichloride here used is highly selective for the adrenal cortical hormone and it removes that hormone almost quantitatively from the aqueous residue and the solution in the ethylene dichloride is in a relatively high state of purity.

We have found that the ethylene dichloride is not a solvent for epinephrin or proteins and that it does not dissolve other objectionable amino compounds that are present in the aqueous phase at this time or which are present in the original mammalian adrenal glands. The ethylene dichloride solution is likewise free from phospholipins and other water soluble impurities present in the aqueous phase treated.

We have found that the total residue in this ethylene dichloride solution of the adrenal cortical hormone has invariably less than 0.1% of the original fresh gland and the inactive impurities which are dissolved in the ethylene dichloride solution consist chiefly of cholesterol and neutral fat which, if considered objectionable, can be removed by a later step which we will describe. The ethylene dichloride product produced is of such a high grade of purity that it is unnecessary to use separate steps for removing the epinephrin and phospholipins and other impurities and the use of the ethylene dichloride constitutes a very marked simplification of the process for preparing purified extracts containing the adrenal cortical hormone.

We have found that the use of benzol in place of the ethylene dichloride will produce an active extract but that its use requires very complete extracting by the petroleum ether step in the process and the benzol is a solvent to a degree of objectionable phospholipins which we may have to remove by a further purification step. Any solvent highly selective for the adrenal cortical hormone but in which the epinephrin and the other above mentioned objectionable impurities are not soluble would be highly satisfactory.

The ethylene dichloride solution is separated from the residue and is concentrated to dryness in vacuo at a low temperature, thus removing the solvent. For further purification the dry residue is dissolved in approximately 1 liter of ethyl alcohol and the alcohol solution is mixed with approximately 500 c. c. of petroleum ether and water added sufficient to make the alcohol concentration approximately 70%.

The petroleum ether layer is then removed and the dilute alcohol phase is extracted with additional quantities of petroleum ether until it is free from the cholesterol. The dilute alcohol solution after separation from the petroleum ether layer is then concentrated in vacuo to remove the alcohol and the aqueous solution is diluted to the required volume and sodium chloride is added to make the solution isotonic. The addition of sodium chloride at this point salts out certain impurities by causing the formation of an inactive precipitate which contains considerable colored material which can be easily removed by filtration or centrifugation.

The aqueous solution is then separated from the precipitate and is sterilized by Berkefeld filtration or by any suitable sterilization process.

We have found that a convenient volume of the finished aqueous extract containing the adrenal cortical hormone is one in which 1 c. c. represents 40 grams of the fresh whole adrenal gland. More or less concentrated extracts can be prepared by varying the volume of the isotonic saline used to dissolve the hormone concentrate. We have found that the above extract contains the adrenal cortical hormone and is substantially free from toxic impurities and is suitable for therapeutic use. The extract containing the active material from 40 grams of fresh whole adrenal gland in each 1 c. c. contains less than 1 milligram of solids exclusive of the added sodium chloride for each 1 c. c.

By employing our method it is possible to obtain a new and improved extract of adrenal cortical hormone. The satisfactory qualities of the finished product are due to a great extent to the use of the ethylene dichloride as solvent for the hormone and to the order in which the steps are taken. Ethylene dichloride could be used for the extraction regardless of the order of or of the other steps taken.

Our invention makes possible the reduction of essential operations necessary to preparing the extract suitable for therapeutic use and permits the production at a greatly reduced cost over the methods heretofore employed. The use of the solid carbon dioxide in the acetone at the first of the operation eliminates much objectionable coloring from the final product and prevents the putrefaction of the fresh, whole adrenal glands during the extraction process.

We have described our process in detail for preparing the extract of adrenal cortical hormone from the fresh adrenal glands of animals. The method and the individual steps thereof could be used for preparing the extract of adrenal cortical hormone from other animal tissue and from tissue fluids and excretion products. It could also be employed to advantage in extracting the adrenal cortical hormone from various aqueous solutions of the hormone however produced and we do not wish to be confined to the specific process used here as an illustration.

Having thus described our invention, what we claim as new and desire to secure by Letters Patent is:

1. The method of preparing active extract of adrenal cortical hormone from mammalian adrenal glands, comprising subjecting said glands to the extracting action of acetone, separating the acetone solution, concentrating the acetone solution to remove the acetone and leave an aqueous residue, subjecting the aqueous residue of the concentration of the acetone solution to the extracting action of petroleum ether, separating the petroleum ether solution from the aqueous residue, subjecting the aqueous residue left after the separation of the petroleum ether solution to the extracting action of ethylene dichloride, separating the ethylene dichloride solution, concentrating the ethylene dichloride solution to remove the ethylene dichloride, dissolving the residue of the concentration of ethylene dichloride solution in ethyl alcohol and adding water to provide the alcohol in a 70% concentration, subjecting said ethyl alcohol solution to the extracting action of petroleum ether, separating the alcohol solution from the petroleum ether solution, concentrating the alcohol solution to remove the alcohol and leave an aqueous residue, adding sodium chloride to the aqueous residue of concentration of the alcohol solution to make the aqueous residue isotonic and to precipitate solids, separating the aqueous residue from the solids, and sterilizing the aqueous residue.

2. The method of preparing active extract of adrenal cortical hormone from mammalian adrenal glands, comprising subjecting said glands to the extracting action of acetone, separating the acetone solution, concentrating the acetone solution to remove the acetone and leave an aqueous residue, subjecting the aqueous residue of the concentration of the acetone solution to the extracting action of petroleum ether, separating the petroleum ether solution from the aqueous residue, subjecting the aqueous residue left after the separation of the petroleum ether solution to the extracting action of ethylene dichloride, separating the ethylene dichloride solution, and concentrating the ethylene dichloride solution to remove the ethylene dichloride.

3. The method of preparing active extract of adrenal cortical hormones from mammalian adrenal glands, comprising subjecting said glands to the extracting action of a water soluble solvent capable of dissolving the adrenal cortical hormone, separating said solution, concentrating said solution to remove the solvent and leave an aqueous residue, subjecting the aqueous residue of the concentration of said solution to the extracting action of petroleum ether to remove fat from said aqueous residue, separating the solution of fat from said aqueous residue, subjecting the aqueous residue left after the separation of said solution of fat to the extracting action of ethylene dichloride, separating the solution, and concentrating said solution to remove the ethylene dichloride.

GEORGE F. CARTLAND.
MARVIN H. KUIZENGA.